(12) United States Patent
Foley

(10) Patent No.: US 8,051,312 B2
(45) Date of Patent: Nov. 1, 2011

(54) APPARATUS AND METHOD FOR REDUCING POWER CONSUMPTION BY AN INTEGRATED CIRCUIT

(75) Inventor: Denis Foley, Shrewsbury, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 834 days.

(21) Appl. No.: 12/123,731

(22) Filed: May 20, 2008

(65) Prior Publication Data
US 2009/0289615 A1    Nov. 26, 2009

(51) Int. Cl.
*G06F 1/32* (2006.01)
(52) U.S. Cl. ......... 713/321; 713/340; 327/538; 323/318
(58) Field of Classification Search ............... 713/321, 713/340; 327/538; 323/318
See application file for complete search history.

(56) References Cited

U.S. PATENT DOCUMENTS

| | | |
|---|---|---|
| 7,096,443 B2 | 8/2006 | Berthold et al. |
| 7,319,358 B2 | 1/2008 | Senthinathan et al. |
| 7,417,482 B2 * | 8/2008 | Elgebaly et al. ............... 327/278 |
| 2006/0218428 A1 * | 9/2006 | Hurd ............................. 713/500 |
| 2007/0120583 A1 | 5/2007 | Lam et al. |

OTHER PUBLICATIONS

Nakai, Masakatsu et al.; Dynamic Voltage and Frequency Management for a Low-Power Embedded Microprocessor; IEEE Journal of Solid-State Circuits; vol. 40, No. 1; Jan. 2005.

* cited by examiner

*Primary Examiner* — Thuan Du
(74) *Attorney, Agent, or Firm* — Vedder Price P.C.

(57) ABSTRACT

An integrated circuit includes an energy controller that generates a power supply voltage level for the integrated circuit based on a desired target frequency value for the integrated circuit. The energy controller configures a programmable hardware process sensor based on the power supply voltage level such that the programmable hardware process sensor is capable of mimicking the electrical characteristics of a predetermined critical path associated with the integrated circuit when operating at the power supply voltage level. By monitoring the frequency of the programmable hardware process sensor over a period of time, the energy controller can compare the monitored frequency to an expected value and determine whether the power supply voltage level can be adjusted or whether it should be maintained.

27 Claims, 6 Drawing Sheets

APPARATUS AND METHOD FOR REDUCING POWER CONSUMPTION BY AN INTEGRATED CIRCUIT

FIELD OF THE INVENTION

The present disclosure generally relates to power consumption in an integrated circuit, and more particularly, to determining a power supply voltage level for an integrated circuit.

BACKGROUND OF THE INVENTION

Wireless, handheld and other battery-powered mobile devices seem ubiquitous in the modern world. Much of the market success enjoyed by these electronic devices is attributable to, among other things, each device's functionality and degree of mobility. While battery-powered devices allow mobile users to operate in all environments and geographical locations, such products are prone to periodic recharging and replacement. In other words, batteries are capable of providing only limited operation time and suffer from a short lifespan. This is compounded by the number of diverse functions and operations that such products are expected to perform. For example, conventional mobile phones are expected to be capable of browsing the internet, capturing digital images, capturing and playing back video and audio recordings, decoding and playing audio files (e.g., audio files saved as MP3 or other MPEG files), etc. Each of these additional, non-traditional functions and operations degrade battery life. Therefore, systems that extend battery life in mobile devices are demanded by consumers.

Generally, the energy consumed by a circuit (e.g., an integrated circuit) is proportional to the product of the following variables: the switching capacitance of the circuit ("C"), the frequency of operation of the circuit ("f"), and the applied supply voltage (e.g., a power supply voltage) ("V") squared. In other words, $E \alpha Cf(V^2)$. For any given circuit, it is further recognized that as the voltage applied to the circuit is increased, the maximum frequency of operation of the circuit is generally increased, and conversely the opposite is also true. Accordingly, a variety of techniques have been developed to take advantage of this principle and vary the power supply voltage level such that the minimum frequency of operation at that voltage level matches the desired frequency of operation. Although the relationship between voltage and frequency generally holds true, there are exceptions. For example, while it may be desirable to run a circuit at a maximum or predetermined frequency of operation (e.g., to ensure fast results), the frequency of operation of the circuit is generally limited not only by the voltage (e.g., the power supply voltage) applied, but is also generally limited by: the technology used to implement the circuit (e.g., CMOS technology), the skill of the designer, the temperature of the circuit (e.g., during operation thereof) and the process corner of the silicon used to fabricate the circuit (e.g., different process corners such as a fast or FF piece of silicon, a slow SS piece of silicon may affect circuit performance, etc.). In short, a circuit designer will typically design a circuit to operate at a guaranteed frequency under so-called "worst case" conditions of: slow silicon, low voltage and worst case (e.g., low or high) temperature. Such a circuit, however, will typically be capable of operating at much higher frequencies, or at the guaranteed frequency with a lower-than-typical voltage applied.

The conventional mechanism for providing a voltage (e.g., a power supply voltage) to a circuit requires at least two components: (1) a power regulator and (2) an energy controller. Conventionally, a power regulator may take the form of a power management integrated circuit (a "PMIC") if the circuit is used as part of a mobile device, or may take the form of a voltage regulator module if the circuit is used as part of a non-mobile device (e.g., a traditional desktop computer). The power regulator is coupled to a power source such as a battery, and supplies the requested level of voltage to the circuit based on one or more control signals or other information from the energy controller. While power regulators are generally located "off" the circuit to which it is supplying the voltage, a power regulator may be configured to be located "on" the same circuit or packaged with the circuit. Generally, energy controllers are configured to request the voltage level (e.g., power supply voltage level) for the circuit and are thus often found on the same circuit for which it is requesting the voltage. In one embodiment, the energy controller is configured to be in communication with a processor or other functional logic block (e.g., a multimedia engine) on the circuit to determine or receive a target frequency value of operation of the processor or other functional block and indicative of a desired frequency for operation. Based on the target frequency value, the energy controller is able to request a suitable voltage from the power regulator. The voltage requested by and/or supplied to the energy controller is generally over-compensated to account for certain circuit variables described above and for other uncertainties such as but not limited to: known voltage tolerances of the voltage regulator, expected voltage losses associated with the printed circuit board (containing the circuit and/or other circuitry) and integrated circuit package(s), and the power delivery system on the circuit. The over-compensation amount is built in to account for these and other inefficiencies and uncertainties. In other words, circuit performance can generally be guaranteed by establishing an over-compensated power supply voltage for the circuit. It is recognized, however, that over-compensating a voltage may have an adverse effect on power consumption.

It is further known that different applications in a device (e.g., a mobile phone) may require different levels of performance from the circuit or chip. For example, the circuit in a mobile phone responsible for decoding MPEG audio may know that it has a predetermined amount of time, T1, to decode the audio stream and a different predetermined amount of time, T2, to perform a different task (e.g., capture and store video). Thus, a circuit designer has at least two options: (1) perform the operation as quickly as possible but in an amount of time less than what is allotted (e.g., less than T1, T2 or any other applicable time period) at a high voltage, and then attempt to use a clock gating technique to turn off the circuit until it is called for use again, or (2) perform the operation throughout the allotted time period but using a reduced amount of power by reducing a frequency of operation and by reducing the supplied voltage level to the level required to support that frequency of operation. It is recognized that the first approach is a bursty, "hurry up and wait" approach and is problematic to implement as a result of the difficulty generally associated with turning on and off circuits (or portions thereof) in response to certain tasks. For example, it is difficult to prevent passive power consumption as a result of current leakage and capacitance discharges. The second approach requires some predictor of circuit performance to determine the minimum frequency of operation and to select an appropriate matching voltage level so that the energy consumed can be reduced. This technique of varying frequency and voltage based on an application to reduce power is known as "dynamic frequency and voltage scaling". A further enhanced technique involving monitoring in real time the frequency capability of the device and further minimizing voltage to the level required to just (i.e., barely) support the desired frequency of operation is referred to as "adaptive voltage scaling". At least two prior art solutions are known that support this approach of monitoring and adjusting the voltage based on real-time circuit feedback.

The first adaptive voltage scaling prior art solution requires knowledge (whether by empirical analysis or extraction) of a critical path of the circuit or a portion of the circuit (e.g., one or more functional logic blocks). A critical path may be a predetermined electronic pathway previously identified as having an impact on the performance of a circuit or portion thereof. A critical path may be determined by simulating the operation of the components comprising the circuit or portion thereof and analyzing a timing report (e.g., during design testing) to identify one or more paths that have the potential (or do) degrade or adversely affect, the performance of the same (e.g., by limiting the frequency and thus efficiency of the circuit). It is usually assumed that, in an integrated circuit, the critical path is determined by the "longest" path (i.e., the path with the maximum signal transmission time). One approach to finding the critical path of a circuit requires an analysis or simulation of the circuit by the circuit designers, wherein it is established for each path whether or not it is longer than the previously-identified longest path. If the current path is shorter than the previously-identified longest path, it will no longer be taken into consideration. However, if the current path is longer, it is considered to be the critical path until, possibly, an even longer path is determined. It is recognized, however, that other approaches exist to determining a circuit's critical path.

Having identified a critical path, the first adaptive voltage scaling, prior art solution replicates the critical path using circuit components and supplies the circuit and the critical path with an initial power supply voltage having a voltage level that is known to ensure sufficient performance of a given task by the integrated circuit (e.g., by one or more functional logic blocks). By monitoring or measuring the frequency of operation of the critical path during operation of the circuit and comparing the measured frequency with an expected value (predetermined using empirical analysis), the first prior art solution is able to adjust the power supply voltage when the results of the comparison indicate that the measured frequency is greater than some function of the expected value, thus reducing the power consumption of the circuit. The first prior art solution, however, suffers from requiring a single, fixed critical path for all operating conditions of the circuit, even when empirical analysis may have determined that there are different critical paths for the circuit over different operating conditions. For example, it is recognized that a critical path may vary across processes, temperature conditions and may change across different voltage conditions. A circuit design whose speed at one voltage level is limited by a gate dominated path may be limited by a wire dominated path at a different voltage level. And, a circuit design limited by a standard threshold voltage transistor path at a first voltage may be limited by a high threshold voltage transistor path at a second voltage.

The second adaptive voltage scaling, prior art solution implements a fixed ring oscillator on the circuit supplied with the power supply voltage where the ring oscillator is configured such that the frequency of the ring oscillator is correlated to the resulting or actual frequency of the circuit. A ring oscillator may be implemented as a chain of functions containing an odd number of inverting functions whose output is fed back to its input and whose output switches with a frequency representative of the delay through the chain of devices. It is recognized that, in one embodiment, the frequency of the ring oscillator is the frequency in which the ring oscillator makes one revolution around the ring. The second prior art solution, like the first prior art solution, monitors the frequency of the ring oscillator with an expected value (also determined based on empirical analysis) and determines whether the voltage supply may be adjusted to conserve power consumption. The second solution, however, suffers to the extent that it is empirically difficult to correlate the monitored frequency levels of a ring oscillator with realized frequencies of the circuit. For example, while one would generally expect a circuit to run faster when the frequency of a representative ring oscillator is faster, empirical analysis shows that this is not always true over all operating conditions. In short, a fixed ring oscillator, like the fixed critical path replication above, is a poor indicator of circuit performance because fixed ring oscillators are not designed to track and adjust for the parameters (e.g., process, temperature, voltage, n-dominated circuitry, etc.) that affect critical paths and hence device performance.

Therefore a need exists to provide a more flexible solution for reducing power in an integrated circuit. Such a solution should compensate for the inefficiencies identified above with respect to fixed critical paths and fixed ring oscillators. Such a solution should also be adapted to stationary/non-mobile devices that would similarly benefit from power savings. Such a solution should also be adaptable to circuits that have multiple voltage islands (e.g., a system on a chip) with one or more power supply voltages.

BRIEF DESCRIPTION OF THE DRAWINGS

The invention will be more readily understood in view of the following description when accompanied by the below figures and wherein like reference numerals represent like elements.

DETAILED DESCRIPTION

Generally, an integrated circuit, method and device are described for determining a power supply voltage level for the integrated circuit. In one embodiment, the integrated circuit includes an energy controller that generates a power supply voltage level for the integrated circuit based on a desired target frequency value for the integrated circuit. The energy controller also configures a programmable hardware process sensor based on the power supply voltage level such that the programmable hardware process sensor is capable of mimicking the electrical characteristics of a predetermined critical path associated with the integrated circuit when operating at the power supply voltage level. By monitoring the frequency of the programmable hardware process sensor over a period of time, the energy controller can compare the monitored frequency (e.g., a sensor count value) to an expected value (e.g., an expected count value) and determine in real-time whether the power supply voltage level can be adjusted (e.g., lowered) or whether it should be maintained. Thereafter, the process may end (e.g., if the voltage should be maintained) or the process may loop back on itself to compute a new sensor count value based on the adjusted power supply voltage level.

In one embodiment, the programmable hardware process sensor includes a programmable ring oscillator that includes a plurality of predetermined paths where each path includes a plurality of path sections. Each path section is capable of mimicking a corresponding predetermined electrical characteristic of the critical path and is enabled or disabled by a sensor control signal (or, in one embodiment, by a programmable ring oscillator control signal).

Accordingly, in one embodiment, it is recognized that the programmable hardware process sensor and the energy controller, as generally described above and more specifically described below, accounts for variations in process, temperature and voltage delivery to the integrated circuit and is capable of running the integrated circuit at the lowest possible supply voltage to achieve a desired performance level (e.g., running at a target frequency value).

Figure 1:
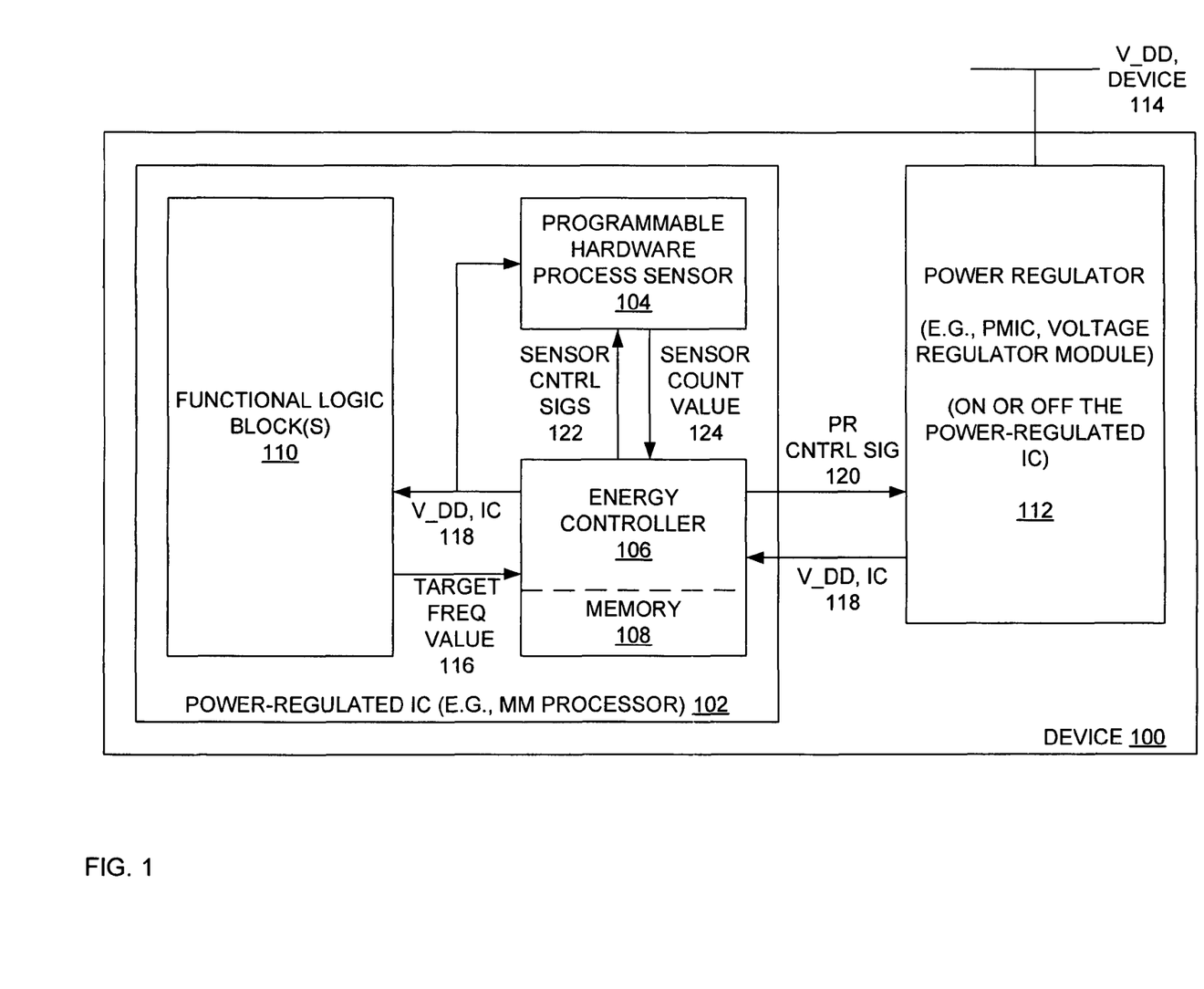
FIG. 1 illustrates a block diagram of exemplary integrated circuit having a programmable hardware process sensor and energy controller in accordance with one embodiment of the present disclosure.

FIG. 1 illustrates a block diagram of exemplary integrated circuit 102 in device 100 having a programmable hardware process sensor 104 and energy controller 106 in accordance with one embodiment of the present disclosure. FIG. 1 also includes memory 108, one or more functional logic blocks 110 and power regulator 112. Each of the components illustrated in FIG. 1 may be coupled to one another, directly or indirectly, using any suitable interface, link or connection, as recognized by one having ordinary skill in the art.

As used herein, the term "processor" may refer to one or more dedicated or non-dedicated: microprocessors, microcontrollers, sequencers, microsequencers, digital signal processors, processing engines, hardware accelerators, application specific circuits (ASICs), state machines, programmable logic arrays, and/or any single or collection of circuit components that is or are capable of processing data or information, and any combination of the above. Similarly, "memory" may refer to any suitable volatile or non-volatile memory, memory device, chip or circuit, or any storage device, chip or circuit such as, but not limited to, system memory, frame buffer memory, flash memory, random access memory (RAM), read only memory (ROM), a register, a latch, a computer readable medium or any combination of the above. Memory may be capable of storing, among other things, executable instructions or code for execution by a processor. For the avoidance of doubt "logic" may refer to any electric circuitry or circuit components (whether on one or more circuits or integrated circuits) such as but not limited to processors (capable of executing executable instructions), transistors, electronic circuitry, memory, combination logic circuit, or any combination of the above that is capable of providing a desired operation(s) or function(s). The term "integrated circuit" may be used interchangeably to designate both a circuit in its totality (e.g., a chip) and a partial section of the same. A "signal" may refer to any suitable data, information or indicator. Additionally, as is appreciated by those having ordinary skill in the art, logic and processes can be described in a hardware description language such as Verilog™, VHDL, or any suitable hardware description languages.

Device 100 is supplied with a device power supply source V_DD, Device 114, which may be any suitable power source such as but not limited to a battery source, a conventional electrical outlet, etc. Device 100 may be any suitable device such as a mobile device or a non-mobile device. For example, device 100 may be a laptop computer, a desktop computer, a PDA, a mobile phone, etc. Integrated circuit 102 may be any suitable circuit or circuits including one or more integrated circuits. It is recognized that integrated circuit 102 may include one or more functional blocks 110. The one or more functional blocks 110 may include one or more processors, engines, accelerators, state machines, interfaces, memory, or any other piece of logic (e.g., one or more circuit components that is capable of performing one or more fixed or programmable tasks or operations).

In operation, the energy controller 106 receives a target frequency value 116 indicating a target frequency value of operation for the integrated circuit 102 or, in one embodiment, the target frequency value of operation for one or more functional logic blocks 110. In one embodiment, the target frequency value 116 is set by the one or more functional logic blocks 110 based on the known requirements of a particular operation to be performed by the one or more functional blocks 110. The known requirements may be determined in real time by the functional logic blocks 110 or may be predetermined (empirically, as a result of standards or otherwise) and accessible to one or more functional logic blocks 110 in memory 108 (the communication link therebetween is not specifically shown).

The energy controller 106 is responsible for, among other things, requesting the power supply voltage V_DD, IC 118 for the integrated circuit 102 at the appropriate power supply voltage level from the power regulator 112 using power control signal 120. Power control signal 120 instructs power regulator 112 to supply the requested power supply voltage level as a power supply voltage V_DD, IC 118 at the appropriate voltage level. As noted above, the power regulator 112 may constitute a PMIC or a voltage regulator module, or any other suitable logic that is capable of receiving a power control signal 120 and providing the requested power supply voltage based on or derived from device power supply source V_DD, Device 114. As is recognized, each of the energy controller 106 and the power regulator 112 may be made using any suitable logic.

The energy controller 106 initially determines the power supply voltage level to be a level that ensures proper operation of the integrated circuit 102. In one embodiment, the determination is based on the target frequency value 106, which may correspond to the type of operation to be performed by the functional logic block 110. This safety power supply voltage level may be predetermined based on empirical analysis and stored in memory 108 for access by the energy controller 106. In another embodiment, the energy controller is capable of determining this safety power supply voltage level in real time using any suitable algorithm or technique. Upon determining the initial power supply voltage level, the energy controller 106 issues power control signal 120 requesting power supply voltage V_DD, IC 118 at the determined level. The power supply voltage V_DD, IC 118 is then distributed throughout the integrated circuit 102 using the energy controller 106 and any other suitable power delivery system or network on the integrated circuit 102 (not specifically shown). As explained below, subsequent power supply voltage levels are also determined by the energy controller 106.

Energy controller 106 configures the programmable hardware process sensor 104 based on the determined power supply voltage level such that the programmable hardware process sensor 104 mimics the electrical characteristics of a predetermined critical path associated with the integrated circuit 102 when operating at the determined power supply voltage level. In one embodiment, the energy controller 106 configures the programmable hardware process sensor 104 using one or more sensor control signals 122. The one or more sensor control signals 122 are capable of configuring the programmable hardware process sensor 104 as described below.

The electrical characteristics of the predetermined critical path may vary based on, among other things, transistor process variations (e.g., slow or fast transistors), variations in response of different threshold devices (e.g., devices with different threshold voltages may perform differently under different operating conditions), contributions due to variations in metal across one or more metal layers of the integrated circuit (e.g., electrical effects that are manifest in one or more metal layers), variations due to one or more of: p-dominated (e.g., PMOS transistor dominated) and n-dominated (e.g., NMOS transistor dominated) circuits or devices in a CMOS device or integrated circuit, and variations due to paths that are wire dominated (e.g., long paths). For example, one would expect that paths in the integrated circuit 102 that are wired dominated would behave differently than gate dominated paths. Similarly, long wires are likely to experience a voltage fall out at low voltage levels and long paths with spaced repeaters are likely to behave differently than long paths of the same length with a mixture of short and long sections. Also, metal layers may impart different variations on the paths that are part of such layers that are different than variations on paths in different layers. The one or more sensor control signals 122 configure the programmable hardware process sensor 104 to account for the electrical characteristics of the determined critical path and the programmable hardware process sensor 104 comprises logic that is programmable (e.g., configurable) based on one or more sensor control signals 122 from the energy controller 106.

The critical path which the programmable hardware process sensor 104 is configured to mimic may be determined using any suitable method. In one embodiment, the integrated circuit 102 is analyzed after fabrication using any suitable testing procedure or process so that the critical paths for each power supply voltage is empirically determined. In the same embodiment, corresponding sensor control signals 122 may also be empirically determined such that the programmable hardware process sensor 104 may be configured to model or mimic the electrical characteristics of each empirically-determined critical path. The determined sensor control signals 122 may then be stored in memory 108 and correlated with the corresponding power supply voltage levels. Thus, energy controller 106 may, upon determining the appropriate power supply voltage level, use this determined voltage level to index memory 108 for the applicable sensor control signals 122. It is recognized, however, that any other suitable method or technique may be used to generate sensor control signals 122. Similarly the applicable sensor control signals 122 may be stored or indexed in any other suitable manner.

Energy controller 106 is also configured to determine an expected count value associated with the target frequency value 116. The expected count value may also be determined empirically after fabrication of the integrated circuit 102 and represents the expected frequency of operation of the configured, programmable hardware process sensor 104 after having been driven at the power supply voltage level for a predetermined period of time. Similar to the sensor control signals 122, the expected count values may be stored in memory 108 after the empirical analysis and may be indexed using the target frequency value 116. It is recognized, however, that the expected count value may be determined using any other suitable technique and may be stored or indexed in any other suitable manner.

After being driven at the determined power supply voltage level for a predetermined period of time (e.g., the same predetermined period of time used to determine the applicable expected count value), the configured, programmable hardware sensor 104 generates a sensor count value 124 that represents the actual frequency of operation of the configured, programmable hardware sensor 104. In one embodiment, the programmable hardware sensor 104 includes a counter (not shown) that counts or otherwise accounts for or indicates such frequency. Energy controller 106 is configured to receive the sensor count value 124 and compares the sensor count value 124 with the expected count value to determine whether the power supply voltage level can be adjusted to reduce power consumption by the integrated circuit 102. For example, in one embodiment, energy controller 106 is operative to adjust the power supply voltage level by lowering the power supply voltage level by a predetermined amount when the sensor count value 124 is greater than the expected count value or is greater than the expected count value plus a predetermined threshold amount, wherein the predetermined threshold amount is selected to represent a guard band to ensure that the voltage is never lowered enough such that the sensor count value 124 goes below the expected count value (which would be indicative of a failing circuit). Energy controller maintains the power supply voltage level when the sensor count value 124 is equal to the expected count value (or equal to the expected count value plus a predetermined threshold amount (i.e., guard band)).

The predetermined amount by which the power supply voltage level may be lowered may be empirically determined to account for any desirable degree of granularity and control. It is recognized that such predetermined amount may be stored in memory 108 or may be calculated or generated by energy controller 106 using any suitable technique. The predetermined threshold amount described above is any suitable value that may be added to the expected count value to ensure that the observed sensor count value 124 is sufficiently higher and not merely marginally higher than the expected count value prior to adjustment of the power supply voltage V_DD, IC 118. Thus, the predetermined threshold amount is any suitable value to prevent an undershooting of the expected count value following a power supply voltage level adjustment (as described in greater detail below).

Upon an adjustment of the power supply voltage level, energy controller 106 requests such voltage level from power regulator 112 using power regulator control signal 120, and allows the power regulator 112 to respond to the new voltage level. After waiting another predetermined period of time, energy controller 106 compares the expected count value to a new sensor count value 124. And, the process repeats until the integrated circuit 102 is run at the lowest possible voltage 118 to achieve a desired performance level (e.g., indicated by target frequency value 116).

It is recognized that if the power supply voltage is adjusted sufficiently the energy controller 106 may need to adjust sensor control signal(s) 122 to reconfigure the programmable hardware process sensor 104 based on the new power supply voltage level. In other words, it is recognized that the selection of sensor control signals 122 may correspond to discrete power supply voltage level ranges.

Figure 2:
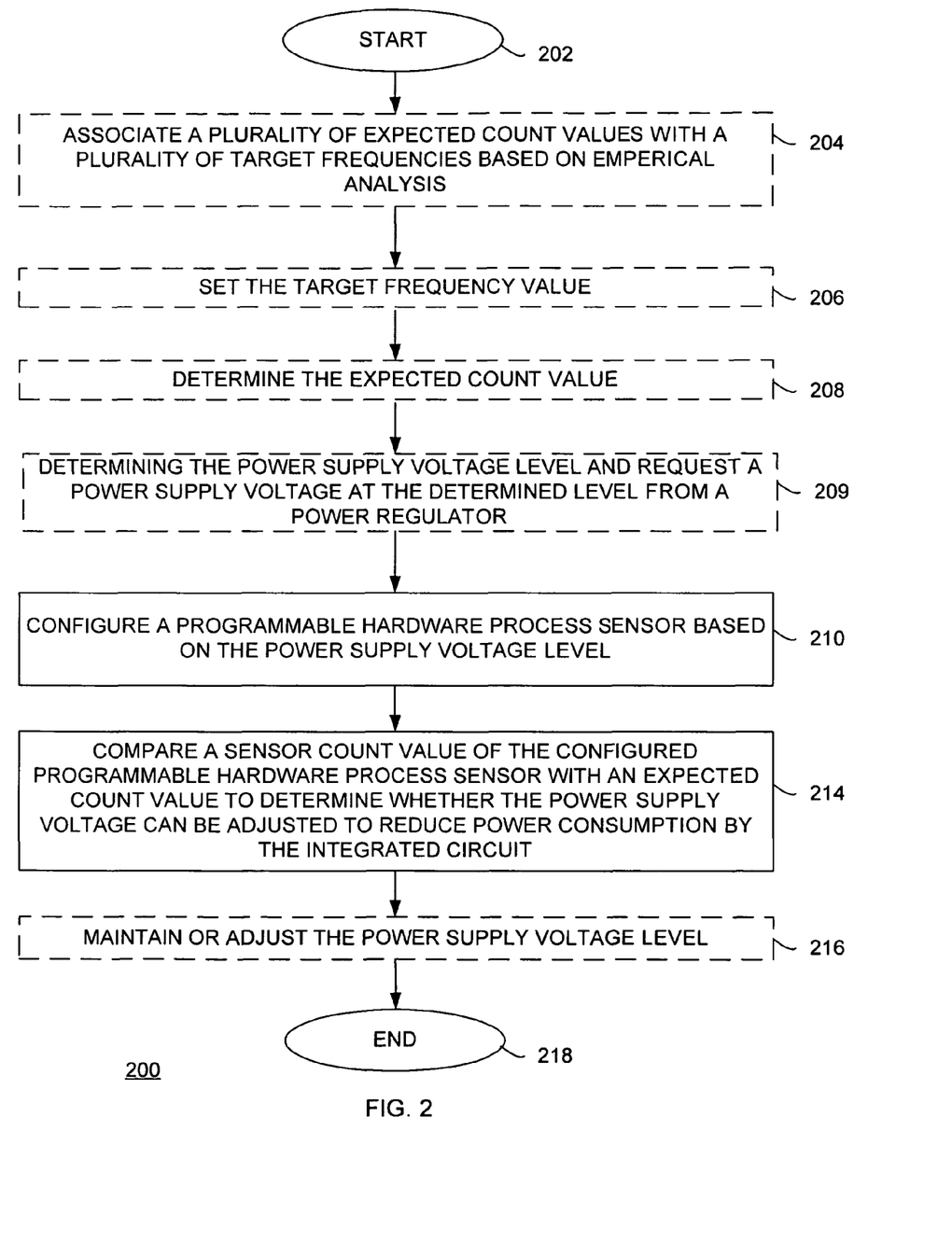
FIG. 2 illustrates a flow chart of an exemplary method for determining a power supply voltage level for an integrated circuit in accordance with one embodiment of the present disclosure.

FIG. 2 illustrates a flow chart of an exemplary method 200 for determining a power supply voltage level for an integrated circuit in accordance with one embodiment of the present disclosure. The method 200 starts in method block 202 where, for example, a variety of empirical analyses are performed on an integrated circuit to determine and correlate: a critical path of the integrated circuit with a spectrum of power supply voltage levels, the determined critical paths with corresponding sensor control signals capable of being used to configure a programmable hardware process sensor to mimic the electrical characteristics of the corresponding critical paths; and an expected count value of the configured, programmable hardware process sensor with corresponding target frequency values for the integrated circuit. The method continues in block 210 where a programmable hardware process sensor is configured based on the power supply voltage level. Thereafter, method 200 includes block 214 where a sensor count value of the configured, programmable hardware process sensor is compared with an expected count value to determine whether the power supply voltage can be adjusted to reduce power consumption by the integrated circuit. Finally, the method ends in block 216. The method may merely "end" or may loop back to block 210 or 214.

In one embodiment, method 200 includes block 204 where a plurality of expected count values is associated with a plurality of target frequencies based on empirical analysis. Method 200 may also include block 206 where the target frequency value is set and block 208 where the expected count value is determined. As noted above, the target frequency value may be set to correspond to a target frequency of the integrated circuit for a particular operation and the expected count value may be determined based on the target frequency value. Method 200 may also include block 209 where a power supply voltage level is determined and a request for the power supply voltage at the determined voltage level is requested from a power regulator. In an initial run through, the determined voltage is a safe voltage level. As illustrated in FIG. 2, each of blocks 204-209 occur prior to block 210. Finally, method 200 may include block 216 where the power supply voltage level is maintained or adjusted based on the results of block 214.

It is recognized that the method blocks of FIG. 2 may be performed, in one embodiment, using the components of device 100 as illustrated in FIG. 1 and described in more detail above. It is further recognized the apparatus and method of FIGS. 1 and 2 provide a flexible approach to running a monitored circuit (e.g., integrated circuit 102) at the lowest possible voltage to achieve a desired performance level (e.g., as indicated by the target frequency value 116). The apparatus and method of FIGS. 1 and 2 provide this result, in part, based on the programmable hardware process sensor 104 which is capable of being dynamically configured to mimic the electrical characteristics of a determined critical path for the determined operating conditions and is therefore reusable for different sections of the circuit or chip and over different operating conditions.

Figure 3:
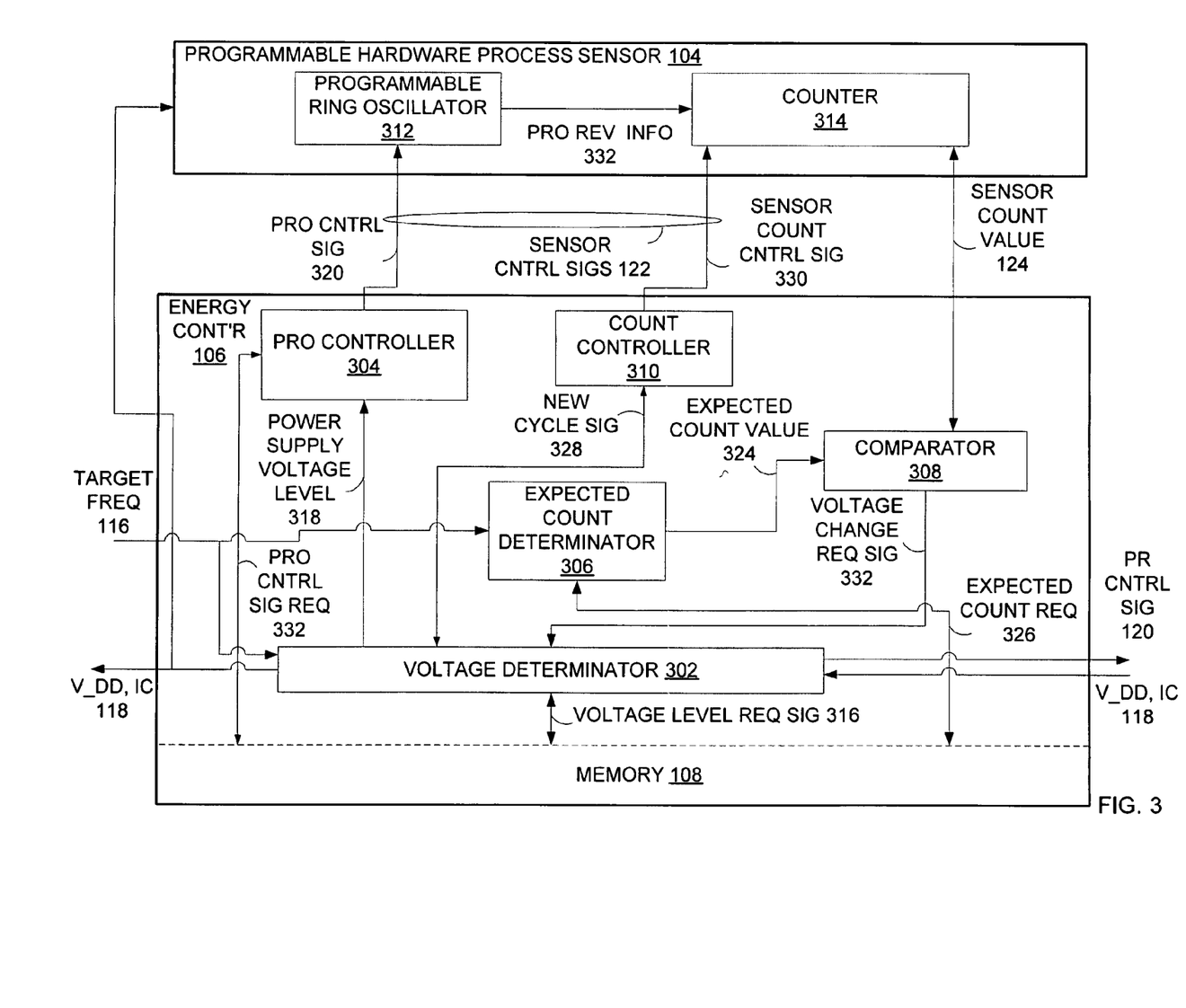
FIG. 3 illustrates a more detailed block diagram of the programmable hardware process sensor and energy controller as illustrated in FIG. 1.

FIG. 3 illustrates a more detailed block diagram 300 of the programmable hardware process sensor 104 and energy controller 106 as illustrated in FIG. 1. As illustrated in FIG. 3, energy controller 106 includes, in one embodiment, voltage determinator 302, programmable ring oscillator ("PRO") controller 304, expected count determinator 306, comparator 308 and count controller 310. Similarly, programmable hardware process sensor 104 includes programmable ring oscillator 312 and counter 314. Each of the above components of the energy controller 106 and the programmable hardware process sensor 104 may be made using logic.

In operation, voltage determinator 302 receives target frequency 116 from, for example, the one or more functional blocks 110 of FIG. 1. Based on the target frequency 116, voltage determinator 302 determines a power supply voltage level by accessing memory 108 via voltage level request signal 316. As described above, the initial power supply voltage level is a level that will ensure proper operation of the integrated circuit 102 and the functional logic blocks 110. Voltage determinator 302 generates power control signal 120 for controlling power regulator 112 and, in return, receives the power supply voltage V_DD, IC 118 having a voltage level at the determined power supply voltage level therefrom, as discussed above. In one embodiment, voltage determinator 302 is also responsible for distributing the power supply voltage V_DD, IC 118 to functional logic blocks 110 or other components of the integrated circuit 102. In another embodiment, a power delivery system or other network may be used for such distribution without being controlled by or passing through voltage determinator 302. Finally, voltage determinator 302 is responsible for passing the determined power supply voltage level 318 to PRO controller 304.

PRO controller 304 generates a PRO control signal 320 based on the determined power supply voltage level 318. In one embodiment, PRO controller 304 communicates with memory 108, via a PRO control signal request 322, to obtain and/or generate the PRO control signal 320. PRO controller 304 uses the generated PRO control signal 320 to configure the programmable ring oscillator 312 to mimic the electrical characteristics of a predetermined critical path associated with integrated circuit 102 when operating at the power supply voltage level 318. PRO control signal 320, as one component of the sensor controls signals 122, is capable of configuring the programmable ring oscillator in the manner just described above and as further described with respect to FIG. 4.

Expected count determinator 306 receives the target frequency 116 and determines an expected count value 324 of the configured, programmable oscillator 312 for the target frequency 116. The expected count value 324 represents an expected frequency of operation of the programmable ring oscillator 312 over a predetermined period of time and may be empirically determined and obtained from memory 108 (as described above) via an expected count request 326 to memory 108.

Count controller 310 receives an indicator (e.g., new cycle signal 328), from voltage determinator 302 that the power supply voltage V_DD, IC 118 has been distributed to the integrated circuit 102 (including functional logic blocks 110 and the programmable hardware process sensor 104). New cycle signal 328 causes count controller 310 to wait a predetermined amount of time (e.g., a small amount of cycles) for the programmable ring oscillator 312 to settle after having been configured with the PRO control signal 320 while being driven at the power supply voltage V_DD, IC 118. Thereafter, count controller 310 issues sensor count control signal 330 to control counter 314.

In response to sensor count control signal 330, counter 314 counts the frequency of operation of the configured, programmable ring oscillator 312. In one embodiment, the counter 314 counts PRO revolution information 332, which represents the number of revolutions of the programmable ring oscillator 312 over a fixed period of time. Sensor count control signal 330 is capable of providing necessary control of counter 314 (e.g., by instruct counter 314 to reset itself prior to each count, to begin counting and to stop counting). At the conclusion of the predetermined period of time, comparator 308 compares a sensor count value 124 (as read or otherwise obtained) to the expected count value 324. Based on the results of the comparison, comparator 308 may instruct voltage determinator 302 to adjust the voltage level of the power supply voltage V_DD, IC 318 using a voltage change request 332. Alternatively, the power supply voltage level may be maintained and the voltage change request signal 332 may represent this instruction.

As described with respect to FIG. 1, following the adjustment or maintenance of the power supply voltage supply level, the process may continue with a new cycle signal 328 being issued to the count controller 310 causing the count controller 310 to reset counter 314 and, following a predetermined settling time, again comparing the sensor count value 124 after the predetermined period of time. As in FIG. 1, this repetitive process allows energy controller 106 to run the integrated circuit6 102 at the lowest possible voltage to achieve a desired performance level.

Figure 4:
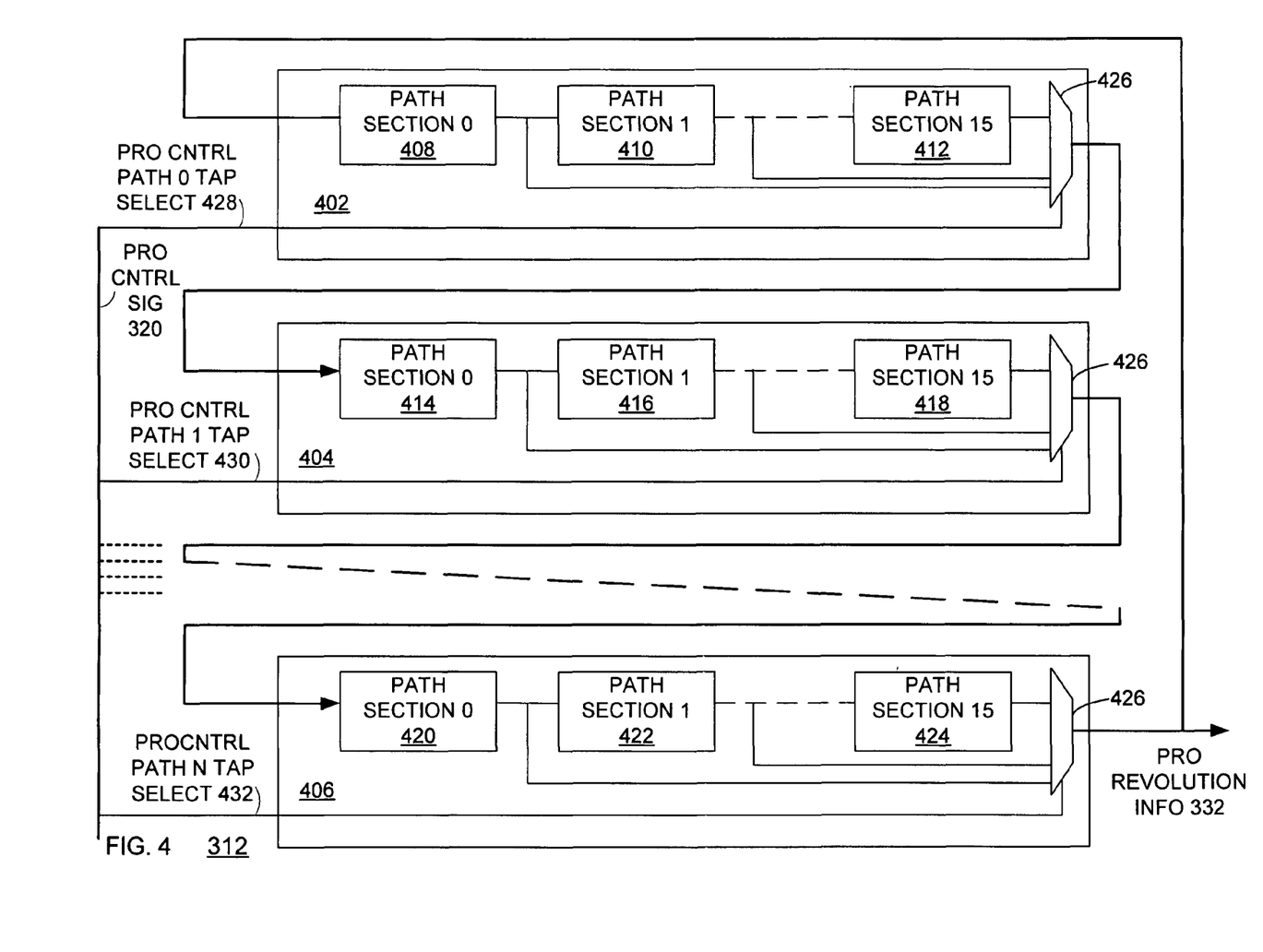
FIG. 4 illustrates a more detailed block diagram of an exemplary programmable ring oscillator of the programmable hardware process sensor of FIG. 3.

FIG. 4 illustrates a more detailed block diagram of an exemplary programmable ring oscillator 312 of the programmable hardware process sensor of FIG. 3. Programmable ring oscillator 312 includes a predetermined number of paths: path 0 402, path 1 404, . . . path n 406. Each path contains a predetermined number of path sections. For example, path 0 402 includes path section 0 408, path section 1, 410, . . . path section 15 412. As illustrated, path 1 404 has path sections 414-418 while path n 406 has path sections 420-424. In one embodiment, each path section associated with a particular path (e.g., path sections 0-15 408-412 of path 0) is capable of mimicking a corresponding, pre-determined electrical characteristic of a critical path associated with integrated circuit 102. For example, each of path sections 408-412 may be capable of mimicking an electrical characteristic that accounts for critical path behavior such as a variation due to the contribution of standard threshold voltage transistors to the critical path, each of path sections 414-418 may be capable of mimicking an electrical characteristic that account for wire-dominated paths, etc. In one embodiment, each path section of a given path contributes equally to mimicking the associated electrical characteristic, while in another embodiment, each path section of a given path has a different weighting factor (i.e., each path section contributes differently to the same electrical characteristic). In yet another embodiment, each path section of a given path is not limited to mimicking the same type of electrical characteristic as each other path section in the same path. For example, path section 0 408 may be capable of mimicking a variation due to responses of different threshold devices while path section 1 410 may be capable of mimicking contributions due to variations in metal across one or more metal layers of the integrated circuit 102. Each path section of a given path feeds the next path section of the same path and culminates in a multiplexor controlled by PRO control signal 320. Each path thereafter feeds the next path.

PRO control signal 320 may include separate bits or information for each path (e.g., PRO control signal path 0 tap select 428 for path 0, path 1 tap select 430 for path 1 and path n tap select 432 for path n). The tap selects of the PRO control signal 320 configures the programmable ring oscillator 312 by controlling multiplexors 426 thereby enabling and disabling individual path sections. As illustrated, each path 402-406 in the embodiment of FIG. 4 has sixteen path sections 408-412, 414-418 and 420-424, respectively. In this embodiment, each tap select 428-432 constitutes a four bit value that is capable of enabling and disabling the individual path sections.

It is recognized that, in one embodiment, the programmable hardware processor 104 (and programmable ring oscillator 312) need not require any separate clocking. Instead, as shown in FIG. 4, the clock to increment counter 314 is simply the output of the last path (e.g., path 406) of the programmable ring oscillator 312 is fed to the input of the first path (e.g., path 402). A reset of the programmable hardware processor 104 (e.g., along sensor control signals 122) may be used to initially seed the programmable ring oscillator 312 with a single transition. It is further recognized that, in one embodiment, each path of the programmable ring oscillator 312 has approximately equally delay associated therewith (e.g., on the order of 10 ns).

Figure 5:
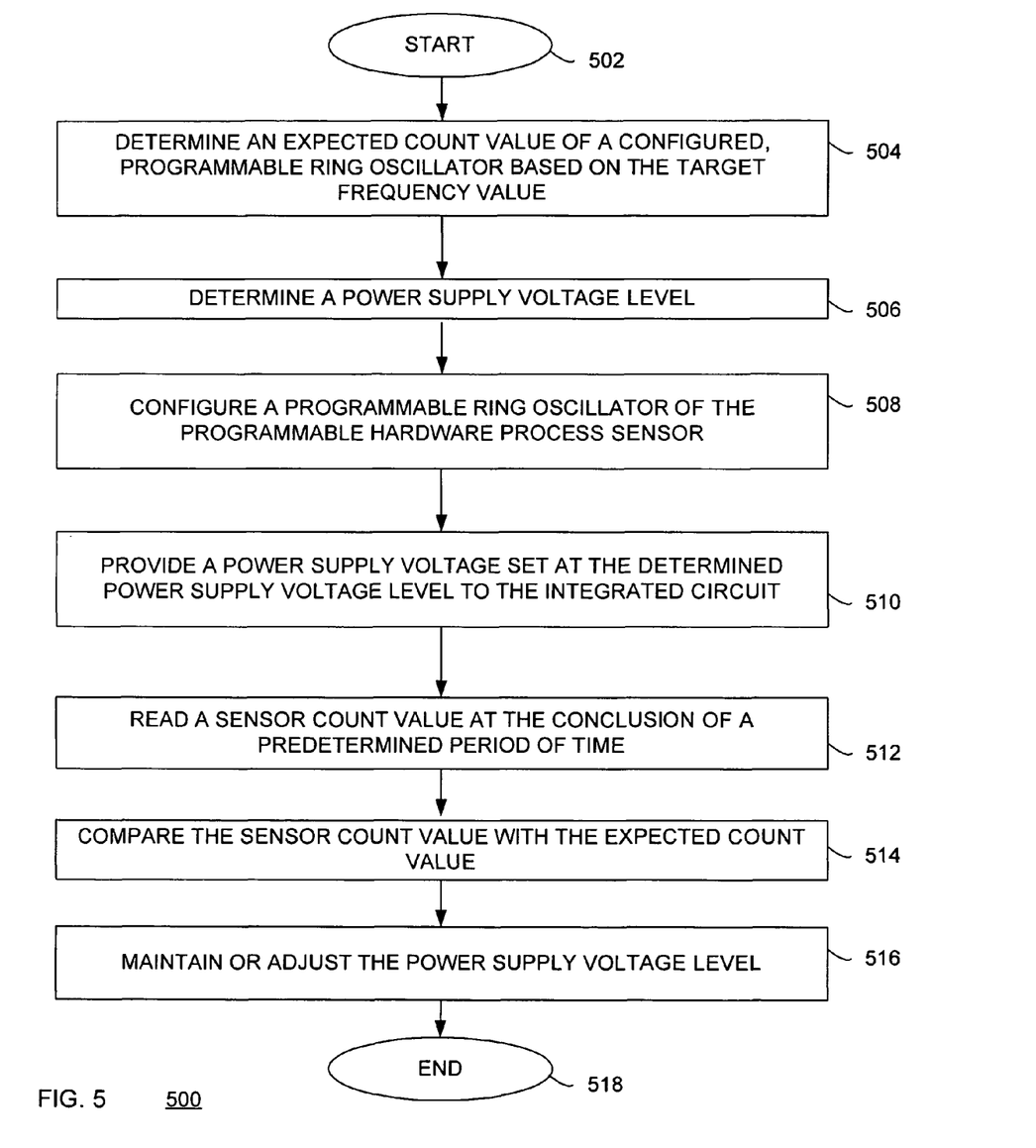
FIG. 5 illustrates a flow chart of an exemplary and more detailed method for determining a power supply voltage level for an integrated circuit in accordance with another embodiment of the present disclosure.

FIG. 5 illustrates a flow chart of an exemplary and more detailed method 500 for determining a power supply voltage level for an integrated circuit in accordance with another embodiment of the present disclosure. The method 500 begins in block 502, where for example, a variety of empirical analyses are performed on an integrated circuit to determine and correlate: a critical path of the integrated circuit with a spectrum of power supply voltage levels, the determined critical paths with corresponding sensor control signals capable of being used to configure a programmable hardware process sensor to mimic the electrical characteristics of the corresponding critical paths; and an expected count value of the programmable hardware process sensor with corresponding target frequency values for the integrated circuit. The method then continues in block 504, where an expected count value of a configured, programmable ring oscillator based on the target frequency value is determined. One having ordinary skill in the art will recognize that block 504 is similar to block 208 of FIG. 2.

The method 500 continues in block 506 where a power supply voltage level is determined, similar to as described in block 209. A programmable ring oscillator of the programmable hardware process sensor is then configured similar to as described above in block 209 of method 200. A power supply voltage (set at the determined power supply voltage level) is then provided to the integrated circuit in block 510 and a sensor count value is read at the conclusion of a predetermined period of time in block 512. Similar to blocks 214 and 216, method blocks 514 and 516 compare the sensor count value with the expected count value and maintain or adjust the power supply voltage level based thereon, respectively. Finally, the method ends in block 518, where for example, in one embodiment, the method loops back to block 510 for further iterations. In another embodiment, the method simply ends with block 518 and the integrated circuit is run at the determined power supply voltage level.

Figure 6:
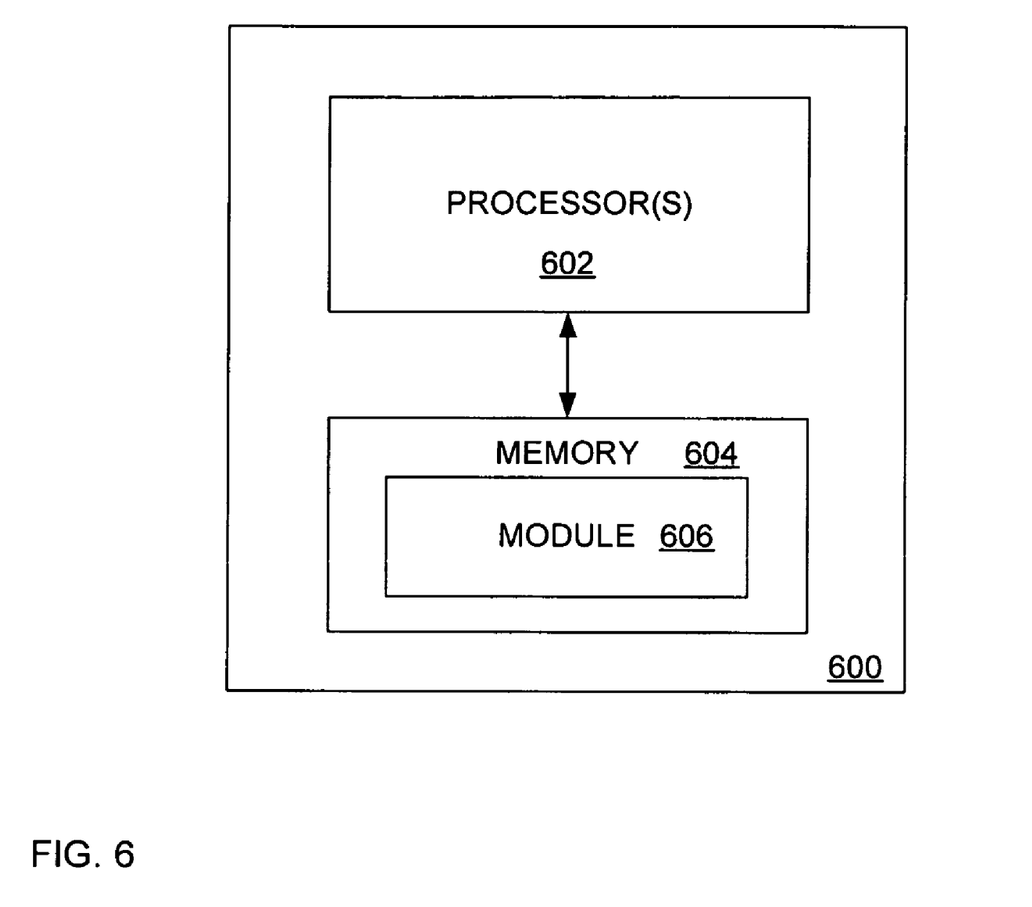
FIG. 6 illustrates an exemplary workstation capable of designing a processor or other logic using any suitable hardware description language in accordance with one embodiment of the present disclosure.

FIG. 6 illustrates a workstation 600 (e.g., a device such as a desktop computer, laptop computer, etc.) including one or more processors 602 coupled to memory 604. Memory includes at least module 606 that stores executable instructions, that when executed by the one or more processors is capable of designing one or more circuits, processors, logic or other circuit components for manufacture. In one embodiment, the executable instructions may constitute hardware description language instructions and the designed piece(s) of logic is the energy controller 106.

Among other advantages, the above method and apparatus allows a monitored integrated circuit such as integrated circuit 102 a way to associate the circuit's performance capabilities with the supplied voltage. The programmable hardware process sensor 104 accounts for variations in process, temperature and voltage delivery to the integrated circuit 102. Thus, the programmable hardware process sensor 104 is capable of running integrated circuit 102 at the lowest possible supply voltage to achieve a desired performance level. Other advantages will be recognized by one of ordinary skill in the art. It will also be recognized that the above description describes mere examples and that other embodiments are envisioned and covered by the appended claims. It is therefore contemplated that the present invention cover any and all modifications, variations or equivalents that fall within the spirit and scope of the basic underlying principles disclosed above and claimed herein.

For example, it is recognized that multiple programmable hardware process sensors may be implemented on an integrated circuit with multiple voltage domains, each operating at a different voltage level. By using multiple programmable hardware process sensors, this embodiment allows a circuit designer to account for and capture cross-chip variations. During implementation, each programmable hardware process sensor would be in communication with one or more energy controllers and a power regulator. The energy controller or voltage determinator would poll the various programmable hardware process sensors (e.g., by comparing the corresponding sensor count values and adjust the circuit's power supply voltage by determining which portion of the chip is slowest.

It is further recognized that one energy controller may control multiple programmable hardware process monitors in multiple frequency and voltage domains by separately polling each hardware process monitor and determining whether the power supply voltage provided to that specific domain should be adjusted or maintained. At a later moment in time, another hardware process monitor could be polled and a similar determination can be made. In other words, a single energy controller can control multiple programmable hardware process monitors by multiplexing (in time) the corresponding sensor count values.

It is further recognized that in one embodiment, the decision to adjust the power supply voltage may allow for the increase of voltage levels using additional threshold values. It is recognized, however, that such threshold values should be chosen to avoid against oscillating between two voltages (i.e., hysteresis) and to avoid an undervoltage situation, which would generally result in chip failure.

In yet another embodiment, it is recognized that energy controller 106 (e.g., comparator 308 and voltage determinator 302) may determine, based on comparison of the sensor count value 124 and the expected count value 324, that the power supply voltage level should be increased. It is recognized that this may be desirable due to a change in temperature or a loss in the power distribution scheme (e.g., due to heavier loads in the on-chip distribution). It is further recognized that in such an embodiment, where the power supply voltage should increase, comparator 308 may make such a determination using one or more thresholds that provide some hysteresis to prevent extraneous voltage switchings. For example, circuit performance can be negatively altered if the threshold values used by the comparator 308 are not set properly thereby causing the power supply voltage to alternate between two voltage levels over time.

What is claimed is:

1. An integrated circuit for use in determining a power supply voltage level for the integrated circuit, comprising:
   an energy controller operably coupled to a programmable hardware sensor, wherein the energy controller is operative to configure the programmable hardware process sensor based on a power supply voltage level,
   wherein the programmable hardware process sensor is operative to generate a sensor count value that represents a frequency of operation of the configured, programmable hardware process sensor after having been driven at the power supply voltage level for a predetermined period of time, and
   wherein the energy controller is operative to compare the sensor count value with an expected count value to determine whether the power supply voltage level can be adjusted to alter power consumption by the integrated circuit.

2. The integrated circuit of claim 1, further comprising one or more functional logic blocks capable of performing operations on data, wherein the one or more functional blocks are operative to set a target frequency value of operation for the integrated circuit based on the requirements of a particular operation to be performed by the one or more functional blocks.

3. The integrated circuit of claim 2, wherein the energy controller is further operative to determine the expected count value based on the target frequency value.

4. The integrated circuit of claim 2, further comprising memory operably coupled to the energy controller and operative to store a plurality of expected count values, wherein each expected count value is associated with a corresponding particular target frequency value, and wherein each association was previously determined based on empirical analysis of the programmable hardware process sensor and the one or more functional logic blocks over a spectrum of operating conditions.

5. The integrated circuit of claim 1, wherein the energy controller is further operative to request a power supply voltage at the power supply voltage level from a power regulator operably coupled to the integrated circuit, and is further operative to provide the received power supply voltage to the integrated circuit.

6. The integrated circuit of claim 1, wherein:
   the energy controller is further operative to determine the power supply voltage level,
   the power supply voltage level is initially determined to be a predetermined voltage level to ensure proper operation of the integrated circuit; and
   thereafter, the power supply voltage level is determined based on the results of the comparison of the sensor count value and the expected count value.

7. The integrated circuit of claim 1, the energy controller is further operative to configure the programmable hardware process sensor such that the configured, programmable hardware process sensor mimics the electrical characteristics of a predetermined critical path associated with the integrated circuit when operating at the power supply voltage level.

8. The integrated circuit of claim 7, wherein the programmable hardware process sensor comprises:
   a programmable ring oscillator comprising a predetermined number of paths, wherein each path comprises a predetermined number of path sections, wherein each path section is associated with a particular path is capable of mimicking a corresponding predetermined electrical characteristic of a critical path associated with the integrated circuit, wherein the energy controller is operative to configure the programmable hardware process sensor by configuring the programmable ring oscillator such that the programmed ring oscillator mimics the electrical characteristics of the predetermined critical path associated with the integrated circuit when operating at the power supply voltage level.

9. The integrated circuit of claim 8, wherein each of the predetermined electrical characteristics account for critical path behavior associated with at least one of:
- transistor process;
- relative performance of different threshold devices;
- metal layers of the integrated circuit;
- p-dominated and n-dominated circuits in a CMOS device; and
- paths that are wire dominated.

10. The integrated circuit of claim 8, wherein the programmable hardware process sensor further comprises a counter that is operative to count the frequency of operation of the programmable ring oscillator.

11. The integrated circuit of claim 1, wherein:
- the energy controller is operative to adjust the power supply voltage level by lowering the power supply voltage level by a predetermined amount when the sensor count value is greater than one of:
  - the expected count value, and
  - the expected count value plus a predetermined threshold amount; and
- the energy controller is operative to maintain the power supply voltage level when the sensor count value is equal to one of:
  - the expected count value; and
  - the expected count value plus a predetermined threshold amount.

12. A method for determining a power supply voltage level for an integrated circuit, comprising:
- configuring a programmable hardware process sensor located on the integrated circuit based on a power supply voltage level; and
- comparing a sensor count value of the configured programmable hardware process sensor with an expected count value to determine whether the power supply voltage level can be adjusted to alter power consumption by the integrated circuit, wherein the sensor count value represents a frequency of operation of the configured, programmable hardware process sensor after having been driven at the power supply voltage level for a predetermined period of time.

13. The method of claim 12, further comprising:
- associating a plurality of expected count values with a plurality of target frequency values based on empirical analysis of the programmable hardware process sensor and the one or more functional logic blocks of the integrated circuit over a spectrum of operating conditions; and
- determining the expected count value based on a target frequency value of operation for the integrated circuit.

14. The method of claim 12, further comprising setting a target frequency value of operation for the integrated circuit based on the requirements of a particular operation to be performed by the one or more functional blocks.

15. The method of claim 12, determining the power supply voltage level such that the power supply voltage level is one of:
- determined to be a predetermined voltage level to ensure proper operation of the integrated circuit; and
- based on the results of the comparison of the sensor count value with the expected count value.

16. The method of claim 12, further comprising requesting a power supply voltage at the power supply voltage level.

17. The method of claim 12, wherein the configured, programmable hardware process sensor is configured to mimic the electrical characteristics of a predetermined critical path associated with the integrated circuit when operating at the power supply voltage level.

18. The method of claim 17, wherein each of the predetermined electrical characteristics account for critical path behavior associated with at least one of:
- transistor process;
- relative performance of different threshold devices;
- metal layers of the integrated circuit;
- p-dominated and n-dominated circuits in a CMOS device; and
- paths that are wire dominated.

19. The method of claim 12, further comprising:
- lowering the power supply voltage level by a predetermined amount when the sensor count value is greater than one of:
  - the expected count value, and
  - the expected count value plus a predetermined threshold amount;
- maintaining the power supply voltage level when the sensor count value is equal to one of:
  - the expected count value; and
  - the expected count value plus a predetermined threshold amount.

20. An integrated circuit for use in determining a power supply voltage level for the integrated circuit, comprising:
- an expected count determinator operative to determine an expected count value of a configured programmable oscillator for a target frequency value of operation for the integrated circuit;
- a voltage determinator operative to determine a power supply voltage level and to provide a power supply voltage set at the determined power supply voltage level to the integrated circuit;
- a programmable ring oscillator controller operative to generate a programmable ring oscillator control signal based on the determined power supply voltage and to configure a programmable ring oscillator based on the programmable ring oscillator control signal,
- a comparator operative to read a sensor count value at the conclusion of a predetermined period of time and to compare the sensor count value with the expected count value, wherein the sensor count value represents the frequency of operation of the configured, programmable ring oscillator, and
- wherein the voltage determinator is operative to adjust or maintain the power supply voltage level based on the comparison of the sensor count value with the expected count value.

21. A method for determining a power supply voltage level for an integrated circuit, comprising:
- determining an expected count value of a configured programmable ring oscillator for the target frequency value;
- determining a power supply voltage level;
- configuring a programmable ring oscillator of the programmable hardware process sensor based on the determined power supply voltage level;
- providing a power supply voltage set at the determined power supply voltage level to the integrated circuit;
- reading a sensor count value at the conclusion of a predetermined period of time, wherein the sensor count value represents the frequency of operation of the configured, programmable ring oscillator;
- comparing the sensor count value with the expected count value;

adjusting or maintaining the power supply voltage level based on the comparison of the sensor count value with the expected count value.

22. The method of claim 21, wherein the power supply voltage level is initially determined to be a predetermined voltage level to ensure proper operation of the integrated circuit for operation at least substantially at a target frequency value of operation of the integrated circuit.

23. The method of claim 21, wherein configuring a programmable ring oscillator of the programmable hardware process sensor based on the determined power supply voltage level comprises determining a programmable ring oscillator control signal based on the determined power supply voltage level.

24. The method of claim 21, wherein reading a sensor count value at the conclusion of a predetermined period of time, comprises:
- waiting a first predetermined period of time following the configuration of the programmable ring oscillator to allow the programmable ring oscillator to stabilize;
- resetting a counter associated with the programmable ring oscillator;
- running the counter for another predetermined period of time and reading the sensor at the conclusion of the another predetermined period of time, thereby yielding the sensor count value.

25. A device comprising:
an integrated circuit for use in determining a power supply voltage level for the integrated circuit, wherein the integrated circuit comprises:
- an energy controller operably coupled to a programmable hardware sensor, wherein the energy controller is operative to configure the programmable hardware process sensor based on a power supply voltage level,
- wherein the programmable hardware process sensor is operative to generate a sensor count value that represents a frequency of operation of the configured, programmable hardware process sensor after having been driven at the power supply voltage level for a predetermined period of time, and
- wherein the energy controller is operative to compare the sensor count value with an expected count value to determine whether the power supply voltage level can be adjusted to reduce power consumption by the integrated circuit.

26. Memory storing executable instructions and capable of being executed by one or more processors such that when executed by the one or more processors the executable instructions are capable of designing logic that, when manufactured, is configured to:
- configure a programmable hardware process sensor located on the integrated circuit based on a power supply voltage level; and
- compare a sensor count value of the configured programmable hardware process sensor with an expected count value to determine whether the power supply voltage level can be adjusted to alter power consumption by the integrated circuit, wherein the sensor count value represents a frequency of operation of the configured, programmable hardware process sensor after having been driven at the power supply voltage level for a predetermined period of time.

27. The memory of claim 26 wherein the stored executable instructions comprise hardware description language instructions.

* * * * *